United States Patent
Daub

(10) Patent No.: US 9,793,705 B2
(45) Date of Patent: Oct. 17, 2017

(54) DC-TO-DC CONVERTER

(71) Applicant: Hella KGaA Hueck & Co., Lippstadt (DE)

(72) Inventor: Wolfgang Daub, Anröchte (DE)

(73) Assignee: Hella KGaA Hueck & Co., Lippstadt (DE)

( * ) Notice: Subject to any disclaimer, the term of this patent is extended or adjusted under 35 U.S.C. 154(b) by 0 days.

(21) Appl. No.: 14/178,015

(22) Filed: Feb. 11, 2014

(65) Prior Publication Data
US 2014/0233137 A1 Aug. 21, 2014

(30) Foreign Application Priority Data
Feb. 13, 2013 (DE) .................. 10 2013 101 400

(51) Int. Cl.
H02H 7/26 (2006.01)
H02H 3/087 (2006.01)

(52) U.S. Cl.
CPC ............. *H02H 7/268* (2013.01); *H02H 3/087* (2013.01)

(58) Field of Classification Search
CPC ....... H02H 3/087; H02H 7/1213; H02H 7/268
USPC .................................. 361/18, 93.1
See application file for complete search history.

(56) References Cited

U.S. PATENT DOCUMENTS

| | | | |
|---|---|---|---|
| 6,304,068 B1 | 10/2001 | Hui et al. | |
| 6,381,152 B1* | 4/2002 | Takahashi et al. | 363/21.06 |
| 7,113,379 B2* | 9/2006 | Matsumoto | 361/57 |
| 2005/0231870 A1* | 10/2005 | Tajika | 361/71 |
| 2007/0279813 A1* | 12/2007 | Covi et al. | 361/18 |
| 2010/0046124 A1* | 2/2010 | Hibi | 361/18 |
| 2010/0328831 A1* | 12/2010 | Zhang et al. | 361/93.1 |
| 2011/0074356 A1 | 3/2011 | Yamazaki et al. | |
| 2011/0107122 A1 | 5/2011 | Wang et al. | |
| 2011/0169470 A1* | 7/2011 | Itakura | 323/282 |
| 2012/0293017 A1* | 11/2012 | Lidsky et al. | 307/126 |

FOREIGN PATENT DOCUMENTS

| | | |
|---|---|---|
| DE | 102009054957 A1 | 6/2011 |
| DE | 112008004030 T5 | 9/2011 |
| EP | 2475085 A1 | 7/2012 |
| WO | 2012076457 A1 | 6/2012 |

* cited by examiner

*Primary Examiner* — Stephen W Jackson
*Assistant Examiner* — Christopher Clark
(74) *Attorney, Agent, or Firm* — Husch Blackwell LLP

(57) ABSTRACT

A DC-to-DC converter for transporting energy between two networks includes two or more converter circuits connected in parallel, wherein a first semiconductor switch that can be actuated as a function of a voltage drop across the first semiconductor switch is arranged in series to each converter circuit or a second semiconductor switch that can be actuated as a function of a voltage drop across the second semiconductor switch is arranged in series to each converter circuit.

7 Claims, 1 Drawing Sheet

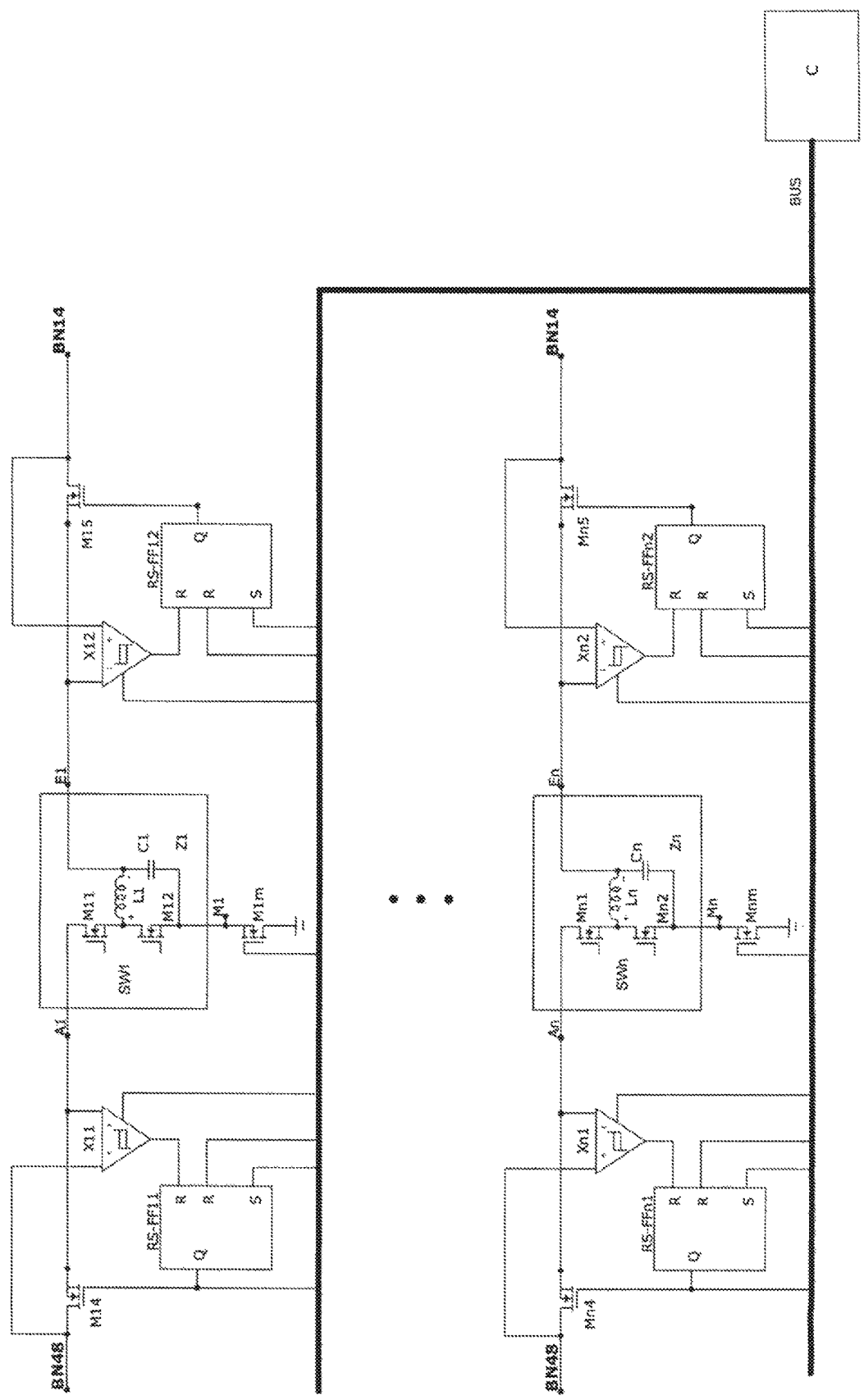

DC-TO-DC CONVERTER

CROSS REFERENCE

This application claims priority to German Patent Application No. 10 2013 101400.3, filed Feb. 13, 2013.

TECHNICAL FIELD OF THE INVENTION

The invention relates to a DC-to-DC converter for transporting energy between two networks comprising several converter circuits connected in parallel.

BACKGROUND OF THE INVENTION

Such DC-to-DC converters with several converter circuits, which are also called converter cells, are known from the prior art. In particular, multi-phase DC-to-DC converters that comprise several converter circuits are known, for example, from DE 11 2008 004 030 T5 and DE 10 2009 054 957 A1. DC-to-DC converters are used, for example, in motor vehicles, in order to couple different electric systems to each other.

If a fault occurs in one of the converter circuits in a DC-to-DC converter with several converter circuits and this causes a short-circuit current, then this can be detected by the controller of the DC-to-DC converter. After the detection of the short-circuit current, the controller switches off the defective converter circuit. From the moment when the short-circuit current occurs up to the moment when the defective converter circuit is switched off, in the known DC-to-DC converters, time can pass that is long enough to allow an increase of the current through the DC-to-DC converter. This current can be so high that the voltages are applied to the networks coupled via the DC-to-DC converters and the networks become unstable or one of these networks becomes unstable. Thus, the monitoring of the currents flowing through the converter circuits by means of the controller can be too slow to prevent a breakdown of the networks.

This is where the present invention comes into play.

The invention is based on the problem of quickly switching off a converter circuit of a DC-to-DC converter of the type named above in the event of a short circuit.

SUMMARY OF THE INVENTION

This problem is solved according to the invention in that a first semiconductor switch that can be actuated as a function of a voltage drop across the first semiconductor switch is arranged in series to each converter circuit and/or a second semiconductor switch that can be actuated as a function of a voltage drop across the second semiconductor switch is arranged in series to each converter circuit. According to whether the first or the second semiconductor switch is present, this switch or each of these switches is used to quickly and safely switch off the defective converter circuit. If both the first and the second semiconductor switches are present, then both can be used to quickly and safely switch off the converter circuit.

The DC-to-DC converter can have means for detecting the voltage drop across the first semiconductor switches and/or means for detecting the voltage drop across the second semiconductor switches. In the event of a short circuit in one of the converter circuits, due to the current increase, the voltage across the first or second semiconductor switch also greatly increases, because this has a forward resistance, even if only very small. This voltage increase is detected. The first or second semiconductor switch is thus used not only as a switching element, but also as a measuring resistor for detecting the increase of the current or for detecting the short circuit.

The means for detecting the voltage drop can be part of threshold switches. The voltages across the first or second semiconductor switch can be detected with these threshold switches and can be compared with at least one switching threshold. Each threshold switch can have at least one output. An output signal that is dependent on the result of the comparison and can be tapped on the output of the threshold switch can be generated with the threshold switches. If, for example, the voltage across the semiconductor switch is higher than a threshold value, the output signal can have a level that corresponds to a logical one, while a logical zero is generated if the voltage is below the threshold value.

Advantageously, the switching thresholds of the threshold switches can be adjusted. For this purpose, the threshold switches can have connections for adjusting the threshold values. The connections for adjusting the switching thresholds of the threshold switches can be connected to the controller. Thus it is possible that the switching thresholds can be adjusted and specified by means of the controller. The switching thresholds can be adapted to changing parameters, for example, by the controller, for example, to a changing temperature of the semiconductor switch. This can be useful because the forward resistance of the semiconductor switch is dependent on the temperature. By adapting the switching thresholds to the changing forward resistance, it can be guaranteed that for the same current through the semiconductor switch, the switching thresholds can be exceeded and/or not reached.

The outputs of the threshold switches can be connected directly to a control input of the first or second semiconductor switch whose voltage drop is detected with the threshold switch.

Alternatively, it is possible that the outputs of the threshold switches are connected via a bistable multivibrator to a control input of the first or second semiconductor switch whose voltage drop is detected with the threshold switch.

The bistable multivibrators can be RS flip-flops. The output of each RS flip-flop can be connected to the control input of one of the first or second semiconductors. A reset input can be connected to the output of the threshold switch that detects the voltage drop of the first or second semiconductor switch whose control input is connected to the RS flip-flop.

The set inputs of the RS flip-flops can be connected to the controller.

According to the invention, the set inputs of the RS flip-flops can be dominant. Therefore, the semiconductor switches can be forced closed by the controller, even if the voltage across this semiconductor switch has exceeded the switching threshold for opening the semiconductor switch.

The reset inputs of the RS flip-flops can also be connected to the controller. Thus, the controller can also cause the semiconductor switch to open.

These aspects are merely illustrative of the innumerable aspects associated with the present invention and should not be deemed as limiting in any manner. These and other aspects, features and advantages of the present invention will become apparent from the following detailed description when taken in conjunction with the referenced drawings.

BRIEF DESCRIPTION OF THE DRAWINGS

Reference is now made more particularly to the drawings, which illustrate the best presently known mode of carrying FIG. 1 a simplified circuit diagram of a DC-to-DC converter according to the invention.

DETAILED DESCRIPTION

In the following detailed description numerous specific details are set forth in order to provide a thorough understanding of the invention. However, it will be understood by those skilled in the art that the present invention may be practiced without these specific details. For example, the invention is not limited in scope to the particular type of industry application depicted in the figures. In other instances, well-known methods, procedures, and components have not been described in detail so as not to obscure the present invention.

The DC-to-DC converter shown in FIG. 1 has n converter circuits, of which a first converter circuit Z1 and an n-th converter circuit Zn are shown. The converter circuits can have, in principle, any converter topology.

Shown in the figure are converter circuits with buck and boost topology. Converter circuits of this topology have a first controllable switching element M11, Mn1 that is designed as a high-side switch and lies between a connection A1, An and a point SW1, SWn. The point SW1, SWn is also connected to a storage inductor L1, Ln and to a low-side switch M12, Mn2. The other connection of the storage inductor L1, Ln is connected to the connection E1, En. The other connection of the low-side switch M12, Mn2 is connected to a ground connection M1, Mn. A capacitor C1, Cn is arranged between the connection E1, En and the ground connection M1, Mn. Outside of the converter switches Z1, Zn, the ground connections M1, Mn are each connected to ground via a third controllable switching element M1*m*, Mnm, wherein the source connections are connected to the ground connections and the drain connections of the third controllable switching elements M1*m*, Mnm are connected to ground. The gate connections are connected to a controller C of the DC-to-DC converter.

The third controllable switching elements M1*m*, Mnm are used as inverse-polarity protection for BN14 and BN48.

The converter circuits are connected in parallel between the networks with the potentials BN48 and BN14 that have a common ground potential.

Connected in series to each converter circuit Z1, Zn, a first semiconductor switch M14, Mn4 and a second semiconductor switch M15, Mn5 are connected, wherein the first semiconductor switches M14, Mn4 connect the connections A1, An of the converter circuits Z1, Zn to the potential BN48 and the second semiconductor switches M15, Mn5 connect the connections E1, En of the converter circuits Z1, Zn to the potential BN14. The source connections are connected to the terminals or to the connections of the converter circuits.

The DC-to-DC converter furthermore has threshold switches X11, X12, Xn1, Xn2, with the voltage drop across each of the first semiconductor switches M14, Mn4 or second semiconductor switches M15, Mn5 being fed to each of these threshold switches that compare these voltages with switching thresholds that are fed to the threshold switches X11, X12, Xn1, Xn2 via connections for setting the switching thresholds. The connections for adjusting the switching thresholds are connected to the controller C.

The threshold switches X11, X12, Xn1, Xn2 deliver a level with a value of a logical one when the voltage drop across the first semiconductor switch M14, Mn4 or second semiconductor switch M15, Mn5 is greater than the set threshold value. Otherwise, they deliver a logical zero to their output.

The outputs of the threshold switches X11, X12, Xn1, Xn2 are connected to reset inputs R of RS flip-flops RS-FF11, FS-FF12, RS-FFn1, RS-FFn2. Additional reset inputs R are also connected to the controller. The RS flip-flops RS-FF11, RS-FF12, RS-FFn1, RS-FFn2 can be reset by a logical one on the reset input, so that a logical zero is output on the outputs Q of the RS flip-flops RS-FF11, RS-FF12, RS-FFn1, RS-FFn2. The reset can be realized both by the controller C and also by the threshold switch X11, X12, Xn1, Xn2 connected to each reset input R, as long as a logical zero is applied to the dominant set inputs S of the RS flip-flops RS-FF11, RS-FF12, RS-FFn1, RS-FFn2. The set inputs S are connected to the controller C. The controller C can therefore set the RS flip-flop RS-FF11, RS-FF12, RS-FFn1, RS-FFn2 connected to a threshold switch X11, X12, Xn1, Xn2 at any time and also despite an exceeding of a switching threshold detected by this threshold switch X11, X12, Xn1, Xn2, so that a logical one is applied on the output Q of the RS flip-flop RS-FF11, RS-FF12, RS-FFn1, RS-FFn2.

The outputs Q of the RS flip-flops are connected to the gate connections of the first and second semiconductor switches M14, Mn4, M15, Mn5. If a logical one is applied to the output Q of an RS flip-flop RS-FF11, RS-FF12, RS-FFn1, FS-FFn2, then the semiconductor switch M14, Mn4, M15, Mn5 connected to this RS flip-flop RS-FF11, RS-FF12, RS-FFn1, RS-FFn2 is closed. If, in contrast, a logical zero is applied, then the first or second semiconductor switch is opened.

The preferred embodiments of the invention have been described above to explain the principles of the invention and its practical application to thereby enable others skilled in the art to utilize the invention in the best mode known to the inventors. However, as various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by the above-described exemplary embodiment, but should be defined only in accordance with the following claims appended hereto and their equivalents.

LIST OF REFERENCE SYMBOLS

Z1 Converter circuit
Zn Converter circuit
E1, En Inputs of the converter circuits (in buck mode, these are outputs, in boost mode, these are inputs)
A1, An Outputs of the converter circuits (in buck mode, these are inputs, in boost mode, these are outputs)
M1, Mn Ground connections of the converter circuits
M11, Mn1 First controllable switching elements of the converter circuits
M12, Mn2 Second controllable switching elements of the converter circuits
L1, L2 Coils of the converter circuits
C1, Cn Capacitors of the converter circuits
M1*m*, Mnm Third controllable switching elements
M14, Mn4 First semiconductor switches
M15, Mn5 Second semiconductor switches
X11, Xn1 Threshold switches
X12, Xn2 Threshold switches RS-FF11, RS flip-flops
RS-FFn1
RS-FF12, RS flip-flops
RS-FFn2
BN48 Electric system
BN14 Electric system

The invention claimed is:

1. A DC-to-DC converter for transporting energy between two networks, comprising:
   a controller;
   two or more converter branch circuits connected in parallel, wherein each converter branch circuit comprises:
   a converter circuit;
   a first semiconductor switch that has a resistance for generating a voltage drop in the conductive state and can be actuated as a function of this voltage drop across the first semiconductor switch arranged in series to the converter circuit;
   a second semiconductor switch that has a resistance for generating a voltage drop in the conductive state and can be actuated as a function of this voltage drop across the second semiconductor switch arranged in series to the converter circuit;
   at least one threshold switch associated with each of the first and second semiconductor switches for detecting the voltage drop across the associated semiconductor switch, and comparing the detected voltage drop with at least one switching threshold, and causing the associated semiconductor switch to open upon detecting a voltage drop above the switching threshold at the associated semiconductor switch;
   an RS flip-flop and the controller in communication with each of the at least one threshold switches and its associated semiconductor switch;
   wherein the controller and the RS flip-flop are operable to transmit a dominant signal to said associated semiconductor switch; and
   wherein the dominant signal is operable to (a) cause the semiconductor switch to close even if a detected voltage drop at the semiconductor switch is above the switching threshold, or (b) cause the semiconductor switch to open even if the detected voltage drop across the semiconductor switch is below the switching threshold.

2. The DC-to-DC converter according to claim 1, wherein the threshold switches have outputs and that an output signal that is dependent on the result of the comparison can be generated with the threshold switches.

3. The DC-to-DC converter according to claim 1, wherein switching thresholds of the threshold switches can be adjusted, in particular, to compensate a temperature drift of the resistor of the first or second semiconductor switch.

4. The DC-to-DC converter according to claim 3, wherein the controller can generate signals with which each semiconductor switch can be controlled and wherein connections for setting the switching thresholds of the threshold switches are connected to the controller and that the switching thresholds can be specified by the controller.

5. The DC-to-DC converter according to claim 2, wherein the output of each RS-flip-flop is connected to the control input of the associated semiconductor switch and a reset input is connected to the output of the threshold switch that detects the voltage drop of the associated semiconductor switch.

6. The DC-to-DC converter according to claim 5, wherein set inputs of the RS flip-flops are connected to the controller.

7. The DC-to-DC converter according to claim 6, wherein the set inputs are dominant with respect to the reset inputs.

* * * * *